United States Patent [19]    [11]  4,422,259
Shimano                           [45]  Dec. 27, 1983

[54] AN ELLIPTICAL SHAPED STREAMLINED FISHING ROD

[75] Inventor: Keizo Shimano, Sakai, Japan

[73] Assignee: Shimano Industrial Company Limited, Osaka, Japan

[21] Appl. No.: 251,762

[22] Filed: Apr. 7, 1981

[30] Foreign Application Priority Data

Apr. 25, 1980 [JP]  Japan .............................. 55-57604[U]
Nov. 27, 1980 [JP]  Japan ........................... 55-170731[U]
Nov. 27, 1980 [JP]  Japan ........................... 55-170732[U]

[51] Int. Cl.³ ............................................. A01K 87/00
[52] U.S. Cl. ...................................... 43/18.1; 43/18.5
[58] Field of Search ......................... 43/18 R, 18 GF; 343/887, 901; 428/36, 408, 902

[56]      References Cited
        U.S. PATENT DOCUMENTS 1,073,260  9/1913  Long ................................. 43/18 R
1,239,356  9/1917  Patrick .............................. 43/18 R
1,293,208  2/1919  Ryan ................................. 43/18 R
1,371,261  3/1921  Price ................................ 43/18 R
1,961,968  6/1934  Heddon .............................. 43/18 R
3,401,482  9/1968  Burns ................................ 43/18 R
3,419,876  12/1968 Edwards et al. ................... 343/901

FOREIGN PATENT DOCUMENTS 39198   11/1981  European Pat. Off. ............ 43/18 R
1172665  3/1969  United Kingdom ............... 43/18 R Primary Examiner—Nicholas P. Godici
Assistant Examiner—Kurt Rowan
Attorney, Agent, or Firm—Stevens, Davis, Miller & Mosher

[57]      ABSTRACT

A fishing rod comprising a first rod having a grip and tapering toward the fore end and a second rod having a tip and a connecting portion connected to the fore end of the first rod, the first rod having an ellipse-like cross sectional shape, the tip at the second rod having a round-like cross sectional shape, the connecting portion changing in cross section from an ellipse-like shape to a round-like shape. A third rod section with an elliptical cross section may be added between the first and second rod sections.

3 Claims, 9 Drawing Figures

FIG. 1
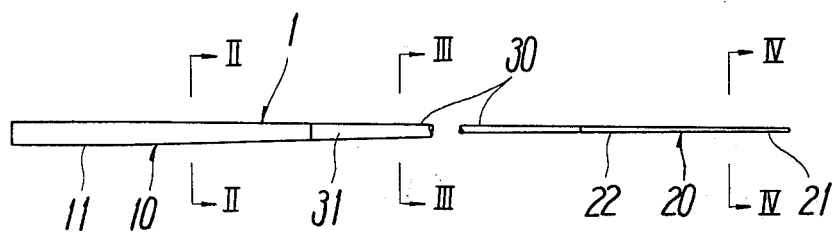
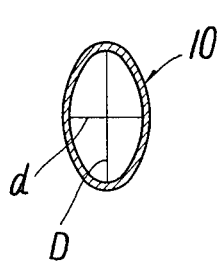
FIG. 2
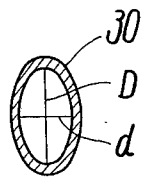
FIG. 3
FIG. 4
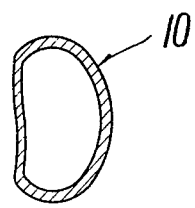
FIG. 5
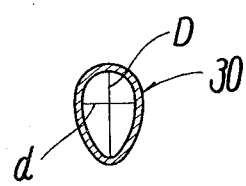
FIG. 6
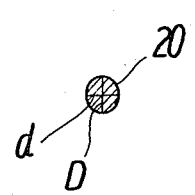
FIG. 7

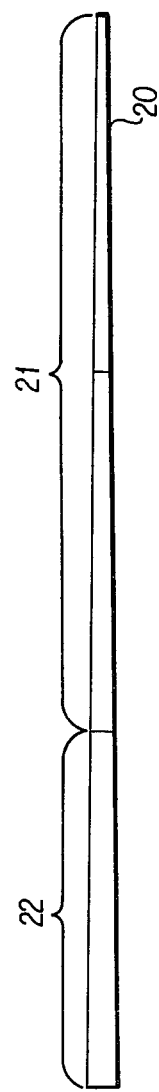
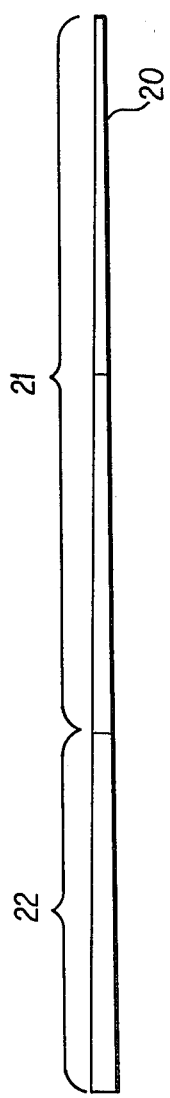

AN ELLIPTICAL SHAPED STREAMLINED FISHING ROD

FIELD OF THE INVENTION

This invention relates to a fishing rod, and more particularly to a fishing rod which comprises a first rod having a grip and which is tapered toward the tip and a second rod having a tip and a connecting portion connected to the first rod, and is used mainly for casting a fishing rig at the end of a fishing line through a swing of the fishing rod.

BACKGROUND OF THE INVENTION

Generally, a fishing rod for casting has a round cross section throughout its length and a portion at grip for mounting a fishing reel. Line-guides are attached to the rod for guiding to the rod tip a line drawn out of the reel, and an angler grips the grip and swings the rod to cast the fishing rig.

A fishing rod having a round cross section is affected by a large air resistance against its swing during casting. When a strong wind is present the rod is subjected to an even greater air resistance, making it difficut for an angler to cast the fishing rig a great distance.

The above problem will be solved by using a fishing rod having an elliptic or streamlined cross section, and by swinging the rod in the direction of the major axis of the elliptic or streamlined cross section. However, this type of rod has the following problem:

A fishing rod having an elliptic or streamlined cross section reduces air resistance against its swing, but the major axis becomes considerably larger in bending strength than the minor axis to cause a directive bending of the rod. As a result, the tip of the fishing rod bends in the direction of the minor axis when the rod swings, thereby making accurate casting difficult. Also, the tip's swing in the direction of the minor axis makes it more difficult for an angler to reel in a hooked fish, or a greater load therefrom acts on the line in the direction of the major axis, resulting in a break in the line.

Furthermore, since the tip has a tendency of directive bending, an angler cannot have a delicate feel for the bite of a fish, which will affect his fishing ability.

SUMMARY OF THE INVENTION

An object of the invention is to provide a fishing rod which permits an angler to easily cast a fishing rig a great distance with accuracy due to less air resistance against a swing of the rod and the absence of lateral bending of the rod tip, making it easy to retrieve a hooked fish with no fear of breaking a fishing line and allowing a delicate feel for the bite of a fish.

The fishing rod of the invention comprises a first rod having a grip and tapered toward the fore end, and a second rod which has a tip and a connecting portion connected to the fore end of the first rod and which is tapered toward the tip. This invention is characterized in that the first rod is elliptic or approximately elliptic in cross section, the tip of the second rod is round or approximately round in cross section, and the connecting portion of the same changes in cross section in transition from an elliptic of approximately elliptic shape to a round or approximately round shape.

The invention includes a fishing rod where the first and second rods are integral with each other, but it is preperable that the first rod is separate from the second and joined thereto when in use.

The invention also includes a fishing rod having a third rod interposed between the first and the second rods to connect them. The third rod, when in use, is made elliptic or approximately elliptic, preferably streamlined, in cross section.

The third rod, when elliptic in cross section, has a larger ratio major axis to the minor axis of the than the first rod. The above ratio at the first rod, when elliptic in cross section, is made to be 10.5 through 1.2:1, preferably 1.1:1, and the ratio at the third rod is 1.05 through 1.5:1, preferably 1.3:1.

The second rod is preferably round in cross section, and alternatively may be elliptic like a round, in cross section, in which the above ratio is defined to be 1.05:1.

The first rod having the grip, or the first rod and third rod connected thereto, are elliptic or approximately elliptic in cross section as abovementioned, so that the fishing rod is easily swingable for casting due to less air resistance against the rod swing, thereby permitting of casting the fishing rig to a great a distance. The tip of the second rod, which is round or approximately round in cross section, can be bent in orientation, so as not to laterally bend during casting, or not to laterally swing when a fish is hooked. Thus, an angler using the fishing rod of the invention can accurately cast the rig and easily exactly take in a hooked fish.

These and other objects of the invention will become more apparent from the detailed description and examples which follow.

BRIEF DESCRIPTION OF THE DRAWINGS

FIG. 1 is a partially cutaway front view of an embodiment of a fishing rod of the invention, FIGS. 2 through 4 are sectional views taken on the lines II—II, III—III and IV—IV in FIG. 1 respectively, FIG. 5 is an enlarged sectional view of a modified embodiment of the invention, corresponding to FIG. 2, FIG. 6 is an enlarged sectional view of another modified embodiment of the invention, corresponding to FIG. 3, FIG. 7 is an enlarged sectional view of still another modified enbodiment of the invention, corresponding to FIG. 4.

FIG. 8 is an enlarged sectional view of a portion of the FIG. 1 embodiment; and

FIG. 9 is an enlarged sectional view of the FIG. 1 embodiment similar to that of FIG. 8, but at a right angle to the FIG. 8 view.

DETAILED DESCRIPTION OF THE INVENTION

Referring to FIG. 1, a fishing rod designated generally by reference numeral 1 comprises a first rod 10 having a grip 11 and which is tapered toward the fore end of the same, a second rod 20 having a tip 21 and taperd toward the tip 21, and a third rod 30 connecting the first and second rods 10 and 20. The respective rods 10, 20 and 30 are separate and joined as shown in FIG. 1.

The first rod 10 is the thickest at the root carrying the grip 11, and the second rod 20 is the thinnest at the tip 21 and has a connecting portion 22 connected to the utmost end of third rod 30, the third rod 30 having a connecting portion 31 connected to the utmost end of first rod 10.

The respective rods 10, 20 and 30 are made from prepreg and hollow-molded, the prepreg comprising fibre, such as glass fibre or carbon fibre, of a durable strength, impregnated with phenol resin or epoxy resin and wound on a mandrel to be heated under pressure. The tip 21 at second rod 20 may be hollow as shown in FIG. 4, or solid as shown in FIG. 7.

The first and third rods 10 and 30 at the fishing rod 1, as shown in FIGS. 2 and 3, are elliptic in cross section respectively, the ellipse having the major axis D and minor d axis intersecting at a right angle with each other and being symmetric with respect to the major and minor axes D,d. The second rod 20 has a round cross sectional tip 21 and a connecting portion 22 which changes in cross section in transition from an ellipical to a round cross section toward the tip 21 of the same. See FIGS. 8 and 9 which are sectional views of the second rod from two views displaced by 90°.

Since the fishing rod 1 comprises the first and third rods 10 and 30 which are elliptic in cross section and the second rod 20 which is round in cross section at its tip, an anguler, when casting the fishing rig at the end of the fishing line, swings the fishing rod keeping the major axis D of respective first and third rods 10 and 30 in the casting direction, thereby enabling an easy casting with a light touch due to less air resistance against the rod swing. The tip 21 at second rod 20 is round in cross section, but extremely smaller in diameter in comparison with the first and third rods 10 and 30 elliptic in cross section, thereby being affected by less air resistance against a swing of the tip 21. Hence, the tip 21 keeps its good swinging efficiency, does not swing laterally or perpendicularly to the casting direction, and fully bends in orientation for casting, whereby the angler can have a bite of a fish and avoid a break of the line caused by an excess force from a hooked fish.

In addition, the grip 11 at first rod 10 is preferably approximately elliptic in cross section to provide an easy grip.

Alternatively, the first rod 10 except for the grip 11 and the third rod 30 each may have a cross section symmetric with respect to the major axis D and not-symmetric with respect to the minor axis d and the periphery at one end side of major axis D is formed in a circular arc larger in curvature than the periphery of a circular arc at the other end side, thereby having streamlined cross sectional shape. This construction will further reduce the air resistance against the rod swing.

In the first rod 10, which is elliptic in cross section, it is preferable that a ratio of the major axis D to the minor axis d of the ellipse is within a range of 1.05 through 1.2:1. Hence, the angler's hand is well fitted to the grip 11 to obtain a better swinging efficiency of the fishing rod. If the ratio exceeds the upper limit of the above range, his hand is not well fitted to the grip 11, and if it exceeds the lower limit, the air resistance is not reduced very much. Experiments have shown that the best ratio has been found to be 1.1:1. The third rod 30 preferably has the above ratio of 1.05 through 1.5:1, thereby also reducing the air resistance against a swinging of third rod 30 while keeping its controllability.

The third rod 30, which has the elliptic cross section of the above ratio within the above range, is subjected to less air resistance and is free from the lateral swinging motion, thereby permitting accurate casting of the rig to a great distance. If the upper limit of the above range is exceeded a lateral swinging motion occurs which reduces a distance of casting, and, if the lower limit is exceeded there is minimal effect in the reduction of air resistance. From the result of experiments, a ratio of 1.3:1 was found as the most preferable for the third rod 30 to reduce air resistance against its swing and keep its swinging efficiency.

Alternatively, the tip 21 also may be approximately elliptic in cross section as shown in FIG. 7, in which a ratio of major axis D to minor axis d of the elliptic cross section is defined as 1.05:1.

The first rod 10 and third rod 30, when different in cross section, are joined through the connecting portion 31 which, for example, changes in cross section in a transition from the first rod 10 to the third rod 30. The second rod 20, when the third rod 30 is used, also is connected thereto through the connecting portion 22 which changes in cross section in a transition from the third rod 30 to the tip 21 of second rod 20, but, when no third rod 30 is used, the connecting portion 22 changes in cross section in transition from the first rod 10 to the tip 21.

In addition, the third rod 30, when in use, may be formed of one or more rods.

As seen from the above, the first rod having the grip, and the third rod, are made elliptic or approximately elliptic in cross section, whereby tha angler can swing the fishing rod for casting in the direction of the major axis of the ellipse in cross section to reduce an air resistance against the rod swing. Also, an elliptic or approximately elliptic grip, is easy to grip and indicates the gripping direction when a reel or line guides are used.

Furthermore, the tip, which is made round or approximately round in cross section, is not restricted to its bending direction but is bendable in the loading direction. Hence, the tip, during the casting, is prevented from bending perpenducularly to the casting direction, thereby accurately casting the fishing rig to a desired place. Also, the tip permits the angler to have a delicate feel for the bite of a fish and avoid a line break even when loaded with a big catch, because of uniform bending with respect to a hooked fish regardless of the directions of the major and minor axes of the elliptic cross section of the first rod.

As many apparently widely different embodiments of this invention may be made without departing from the spirit and scope thereof, it is to be understood that the invention is not limited to the specific embodiments thereof except as defined in the appended claims.

What is claimed is:

1. A fishing rod comprising first, second and third rods, said first rod being provided with a grip and tapering toward a fore end, said third rod interconnecting said first and second rods, said second rod being provided with a tip and a connection portion connected to the fore end of said third rod and tapering toward said tip, said first and third rods each having an ellipse-like cross-sectional shape which includes a major axis and a minor axis, a ratio of the major axis to the minor axis of said third rod being larger than that of said first rod; said tip at said second rod having a round-like cross-sectional shape; and said connecting portion having a cross-sectional shape which changes in cross section from an ellipse-like shape at a portion adjacent said third rod to a round-like shape.

2. A fishing rod according to claim 1, wherein a ratio of the major axis to the minor axis at the elliptic cross section of said first rod is in the range of 1.05 through 1.2:1, and a ratio of the major axis to the minor axis of the elliptic cross section of said third rod is in the range of 1.05 through 1.5:1.

3. A fishing rod according to claim 2, wherein a ratio of the major axis to the minor axis at the elliptic cross section of said first rod is 1.1:1, and a ratio of the major axis to the minor axis at the elliptic cross section of said third rod is 1.3:1.

* * * * *